Figure 1:
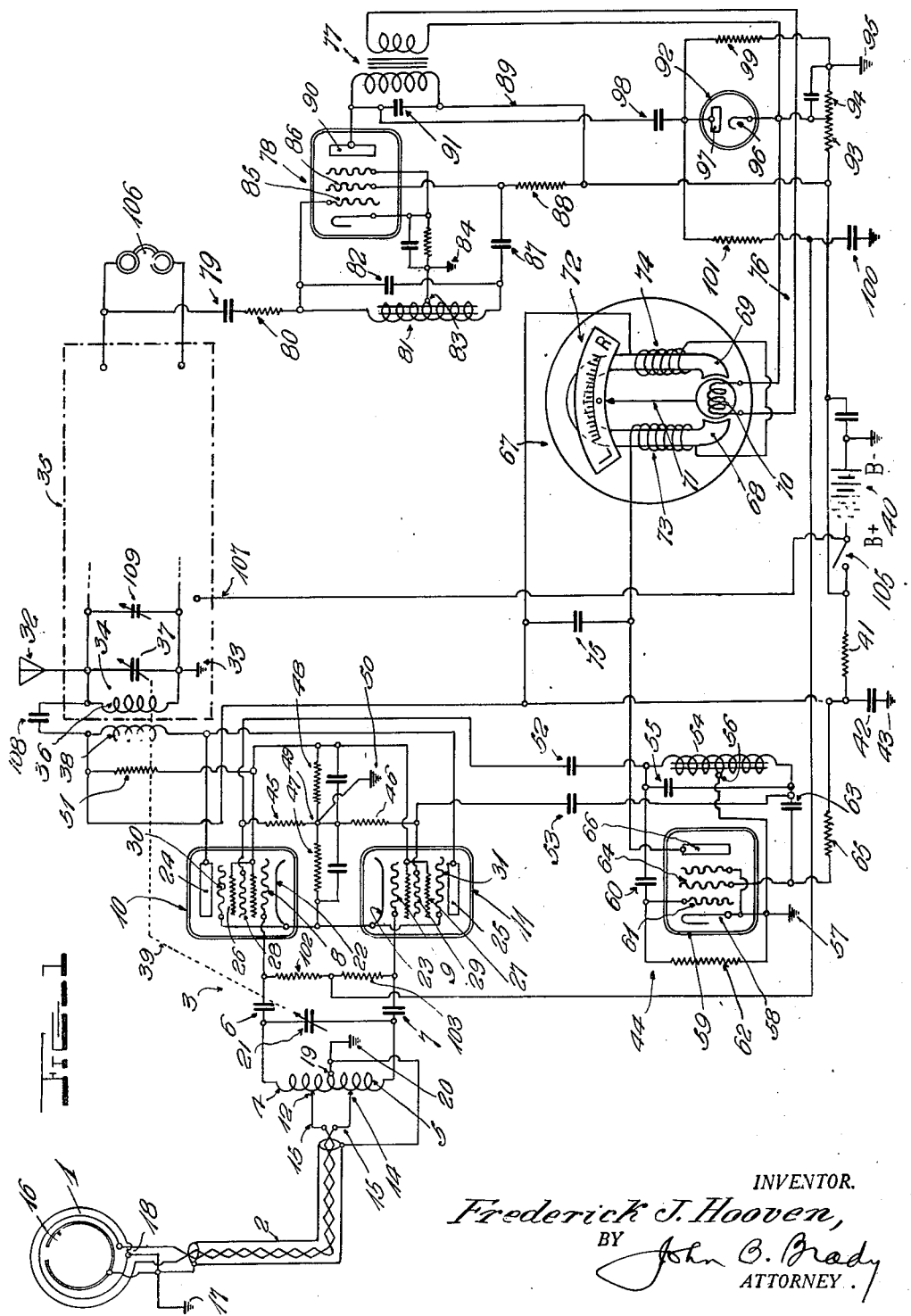

Aug. 24, 1943.     F. J. HOOVEN     2,327,641
RADIO COMPASS
Filed Feb. 12, 1936     3 Sheets-Sheet 2
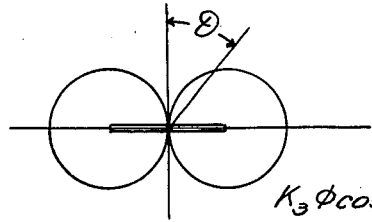
Fig. 2
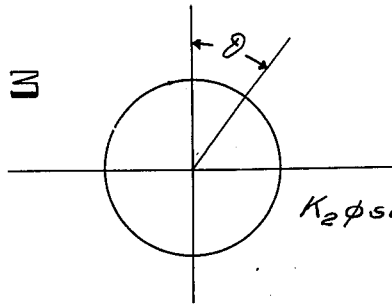
Fig. 3
Fig. 4     Fig. 5
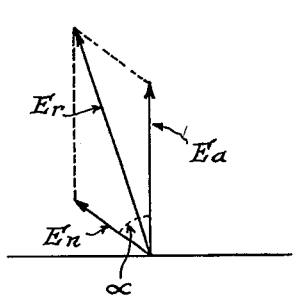
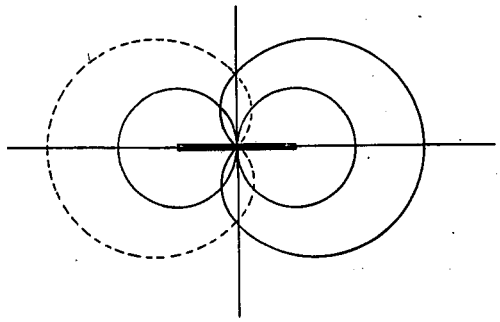
Fig. 6
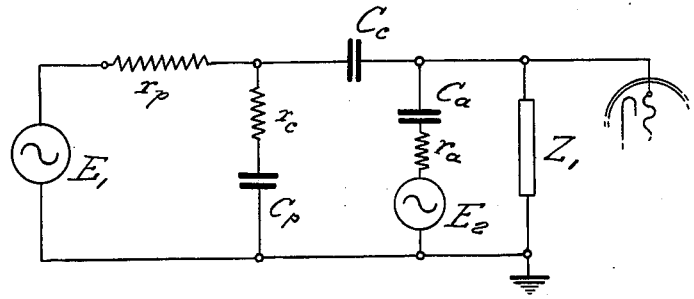
INVENTOR.
Frederick J. Hooven,
BY John B. Brady
ATTORNEY.

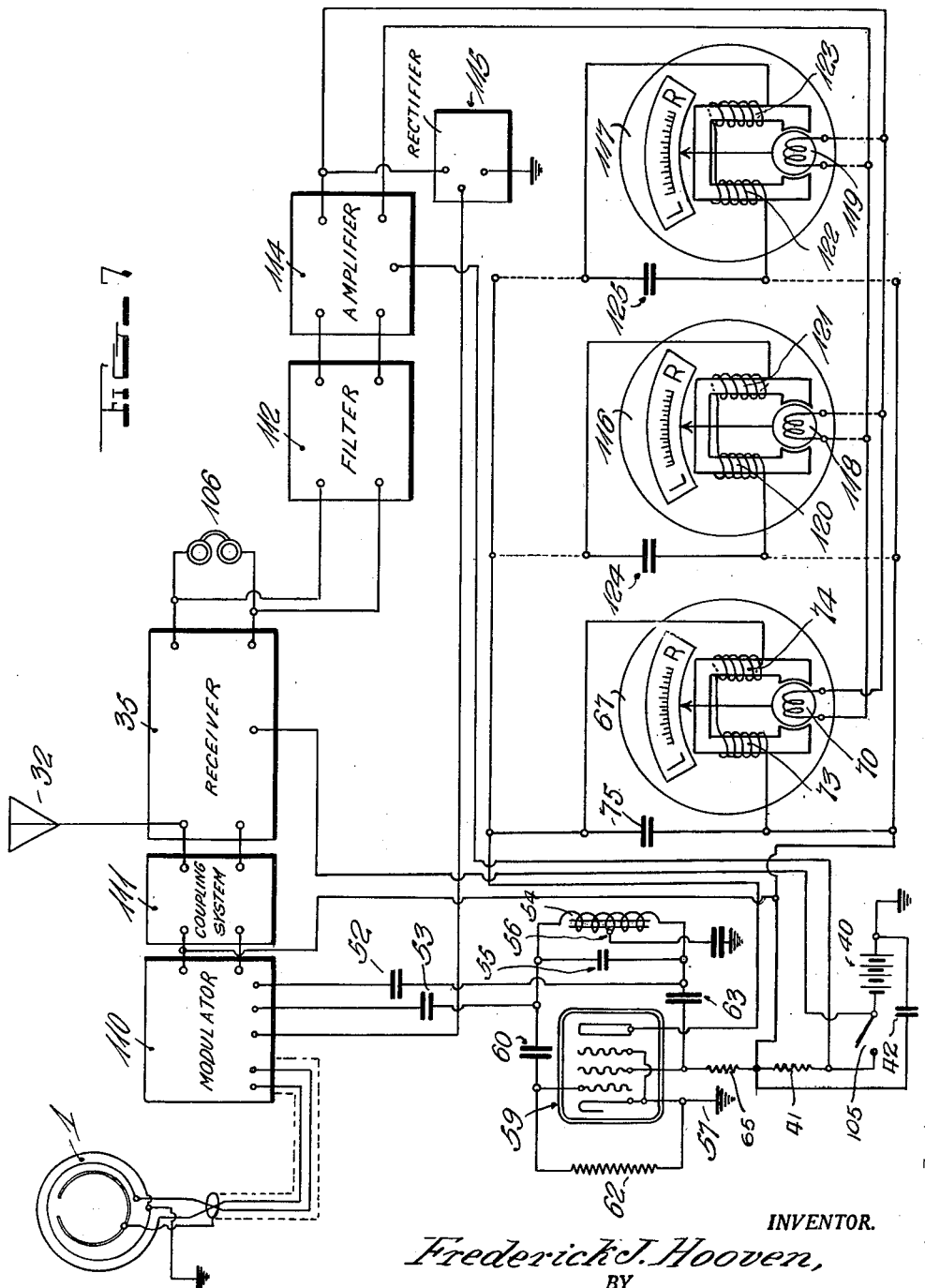

Patented Aug. 24, 1943

2,327,641

UNITED STATES PATENT OFFICE 2,327,641

RADIO COMPASS

Frederick J. Hooven, Dayton, Ohio, assignor to Radio Corporation of America, New York, N. Y., a corporation of Delaware Application February 12, 1936, Serial No. 63,663

12 Claims. (Cl. 250—11)

My invention relates broadly to radio compasses and more particularly to a circuit arrangement for a composite visual and aural radio compass system.

One of the objects of my invention is to provide a construction of radio compass of high precision having means for combining signaling energy received both non-directively and directively and controlling the operation of a visual indicator for precision operation independently of the amplitude of the received signaling energy.

Another object of my invention is to provide a circuit arrangement for a radio compass having means for controlling the bias potential on certain of the circuits of the amplifier system which connects with the directional antenna for insuring precision operation of a visual indicator regardless of the amplitude of incoming signaling energy incident upon the directional antenna relative to a non-directional antenna associated with the radio compass.

Still another object of my invention is to provide a circuit arrangement for a radio compass in which an amplifier connected in circuit with a directional antenna is compactly assembled with an oscillator and a receiving system connected with a non-directional antenna and closely associated with a visual indicator and control mechanism associated therewith with means for avoiding any detrimental effects due to variations in potential which may occur in one portion of the apparatus from being impressed upon any other portion of the apparatus.

A further object of my invention is to provide a circuit arrangement for a radio compass in which a visual indicator device has the actuating windings thereof electronically coupled with the actuating circuits of the radio compass so that the characteristics of the actuating circuits are not affected by the characteristics of the actuating windings.

A still further object of my invention is to provide a selective indicator mechanism for use in a radio compass in which the phase of the energy impressed upon the indicator mechanism is controlled by received signaling energy for effecting a right or left movement of an indicator arm for indicating the position of the radio compass with respect to a transmitter.

Still another object of my invention is to provide a circuit arrangement for increasing the radio frequency potential applied to an amplifier system from a directive antenna for insuring the precision operation of an indicator controlled by the amplifier system.

A further object of my invention is to provide an electronic switch system for a balanced modulator circuit in a radio compass receiver having means for alternately rendering different paths through the balanced modulator system effective.

Another object of my invention is to provide a circuit arrangement whereby the characteristics of the circuit are independent of the impedance of the attached indicators, permitting the free interchangeability of indicators or the use of a plurality of indicators without disturbing the operation of the radio compass.

A further object of my invention is to provide a circuit arrangement whereby a tuned non-directional antenna may be sued without possibility of erroneous indication due to possible mistuning of the non-directional antenna system.

A still further object of my invention is to provide a radio compass circuit which may be adapted to function as an ordinary receiver by means of a simple switch.

Another object of my invention is to provide a circuit which makes possible the use of a transmission line connection to the loop antenna with the loop antenna remote from the remainder of the system.

Other and further objects of my invention reside in the circuit arrangement for a radio compass as set forth more fully in the specification hereinafter following by reference to the accompanying drawings, in which:

Figure 1 is a diagrammatic and schematic view showing the circuit arrangement for the visual and aural radio compass of my invention; Figs. 2, 3, 4, and 5 are polar and vectorial diagrams illustrating the principles of operation of the system of my invention; Fig. 6 is a schematic view illustrative of a simplified circuit of the system of my invention; and Fig. 7 is a schematic view showing the adaptability of my invention for operating two or more indicators on an aircraft.

Referring to Fig. 1 of the drawings, the radio compass includes the shielded loop 1 connected through shielded conduit 2 to the input system of the receiving circuit shown generally at 3. I provide a novel means of connecting loop 1 with the input system 3 by which an increase in radio frequency potential is effected by means of the auto transformer coupling system 4. The inductance 5 of the auto transformer coupling system has the opposite ends thereof connected through coupling condensers 6 and 7 to the control grids 8 and 9 of electron tubes 10 and 11. The inductance 5 is tapped at 12 and 14 to establish connections with the leads 15 extending from the terminals of the loop 1. The shield 16 which partially surrounds the conductors of the loop 1 is connected to ground 17 which also connects to the electrical center of the loop at 13. The shield 2 for the leads 15 is connected to ground 17 as indicated. The electrical center 19 of inductance 5 is connected to ground 20 which is also connected at the receiving set and to the conduit 2 shielding the leads 15. The input system is tuned by means of variable condenser 21. The electron tubes which I have shown embody in addition to the control electrodes heretofore described, cathodes 22 and 23, anodes 24 and 25, shield grids 26 and 27, modulating grids 28 and 29, and suppressor grids 30 and 31. A non-directional antenna system is provided for the radio compass receiver which I have indicated at 32 grounded at 33 and connected to tuned input circuit 34 with the input system to the radio compass receiver which I have indicated generally at 35. The tuned input system 34 includes inductance 36 and tuning condenser 37. I provide a coupling to the tuned input circuit 34 through coupling coil 38 and coupling condenser 108. The tuning condenser 21 of the directional loop circuit is mechanically coupled with the tuning condenser 37 in the tuned input circuit 34 as indicated by broken line 39.

In the system of my invention, the voltage induced in coil 36 by coupling coil 38 and the voltage induced in coil 36 by non-directional antenna 32 remain in constant relation and within a vector angle of ± 45°. The coupling coil 38 is connected in circuit with the anodes 24 and 25 and in circuit with the source of potential indicated generally at 40 connected through resistor 41 as indicated. The resistor 41 coacts with condenser 42 grounded at 43 to provide a filter for preventing variations in the plate current in the tubes 10, 11 and 59 from impressing any degree of similar variation from the source of potential 40 upon the receiver 35, or upon the amplifier indicated generally at 78. I have shown resistors 45 and 46 connected with modulator grids 28 and 29 and serving as grid leaks for the said modulator grids. I provide resistors 47 and 48 with an intermediate connection 49 to a point intermediate resistors 45 and 46 connected to ground at 50. Resistor 47 serves to provide a positive voltage on cathodes 22 and 23 with respect to ground, which voltage is a function of the total cathode current of tubes 10 and 11. This voltage provides that control grids 8 and 9 may oscillate through any normal range without becoming positive with respect to cathodes 22 and 23. Resistor 48 serves to determine the potential supplied to screen grids 26 and 27 through resistor 51 from the high potential supply 40.

The oscillator 44 is capacitively coupled to the modulator grids 28 and 29 through condensers 52 and 53 in such a fashion as to impress on modulator grids 28 and 29 audio frequency $$\frac{\omega 2}{2\pi}$$

voltages of equal value and opposite phase. The plate potential is supplied to the oscillator plate 66 through a circuit connection which includes the actuating windings of the indicating mechanism. The oscillator circuit includes coil 54 which is tuned to the audio frequency $$\frac{\omega 2}{2\pi}$$

This said audio frequency $$\frac{\omega 2}{2\pi}$$

is determined by the inductance 54 and condenser 55 but is entirely independent of the impedance connected to plate 66, the oscillator circuit being complete with grid 61, cathode 58, shield grid 64, coil 54 and condensers 55, 60 and 63. The electrical center 56 of coil 54 is connected to ground at 57 as is cathode 58 of tube 59. One end of coil 54 is connected through condenser 60 to control grid 61 of tube 59, control grid 61 being connected to ground 57 through resistor 62. The opposite end of coil 54 is connected through condenser 63 to the shield grid 64 of tube 59, which shield grid is supplied with a positive potential through resistors 65 and 41 from source 40. As heretofore mentioned, the plate circuit extending from plate electrode 66 of the oscillator 44 is completed through the windings of the indicating mechanism shown at 67.

The indicating mechanism 67 comprises an electromagnetic system having pole pieces 68 and 69 between which an armature is mounted for pivotal movement, which armature carries windings 70. The armature actuates the indicator arm 71 operative over a suitably calibrated dial 72. The electromagnetic system of the device 67 is provided with actuating windings 73 and 74 which are preferably tuned to the frequency $$\frac{\omega 2}{2\pi}$$

by means of condenser 75 and connected in such a fashion that the magnetic flux resulting from current flowing in coil 74 is in the same direction as magnetic flux resulting from current flowing in coil 73.

The windings 73 and 74 are tuned for the reason of improving the power factor of the circuit comprising coils 73 and 74 and condenser 75 providing thereby the maximum of current in said coils with the result that the sensitivity of indicator 67 is at a maximum. Another reason for the tuning of these coils is that the reactance characteristic of the circuit comprising these coils and their associated condenser will not be changed by the addition of one or more similarly tuned coils to the circuit in the event that it is desired to operate more than one indicator from the same radio compass system. Because of this, the phase angles of the separate currents in a plurality of coils so connected will be the same regardless of the number of such coils connected.

The armature winding 70 is connected through leads 76 with the output transformer 77 which connects in the plate circuit of amplifier tube 78. The amplifier tube 78 connects with the output system of radio compass receiver 35 through a filter system consisting of coupling condenser 79, coupling resistor 80, coil 81, which is tuned to frequency $$\frac{\omega 2}{2\pi}$$

by means of condenser 82. A tap 83 of coil 81 is connected to ground 84. One end of coil 81 is connected to control grid 85 of amplifier tube 78. The shield grid 86 of amplifier tube 78 is connected to the other end of coil 81 through condenser 87 and is supplied with a positive potential through resistor 88 from source 40. It will be seen that this connection of the elements of tube 78 is such that tube 78 will tend to oscillate at frequency $$\frac{\omega 2}{2\pi}$$

but condenser 87 and resistor 88 are so proportioned that tube 78 is not permitted to oscillate at frequency $$\frac{\omega 2}{2\pi}$$

to which coil 81 is tuned by condenser 82. The plate potential for tube 78 is supplied from the potential source 40 through lead 89 which connects through the primary winding of output transformer 77 to anode 90. The output transformer is tuned to the frequency $$\frac{\omega_2}{2\pi}$$

by means of condenser 91.

$$I_b = K\left\{\frac{K_1^2\Phi^2}{2}\sin^2\theta(1+\cos 2\omega_1 t) + \frac{K_3^2}{2}(1-\cos 2\omega_2 t) + K_1\Phi\sin\theta[\sin(\omega_1+\omega_2)t - \sin(\omega_1-\omega_2)t]\right\}$$

In describing the method of operation of the radio direction finder, let it be assumed that the receiver 35, the loop 1, the tuning coil 36, are tuned to a frequency $$\frac{\omega_1}{2\pi}$$

whose field strength at the point of location of the direction finder is:

$$\phi \sin \omega_1 t$$

and whose angle with a line normal to the plane of the loop 1 is $\theta$. The current induced in loop 1 by this field strength:

$$\phi \sin \omega_1 t$$

may be expressed as:

$$K_1\Phi \cos \omega_1 t \sin \theta$$

It may then be said, assuming that the loop system consisting of coil 5, loop 1, and lines 15, is tuned to the frequency $$\frac{\omega_1}{2\pi}$$

that the voltage induced on control grid 8 may be expressed as:

$$K_2\Phi \cos \omega_1 t \sin \theta$$

and that the voltage induced on control grid 9 with respect to ground may be expressed as:

$$-K_2\Phi \cos \omega_1 t \sin \theta$$

In Fig. 2, I have plotted the values of the voltages impressed on grids 8 and 9 with respect to $\theta$ as a variable.

The voltage impressed on modulator grids 28 and 29 may be expressed as:

$$K_5 \sin \omega_2 t$$

and is of such a value that during that half of the audio frequency cycle during which modulator grid 29 is most negative with respect to ground tube 11 ceases to function due to the restricting effect on the emission of the tube of the negative voltage on modulator grid 29. During this half of the audio frequency cycle, the modulator grid 28 is most positive and tube 10 will function. During the other half of the audio frequency cycle, grid 28 will be most negative and tube 10 will cease to function and tube 11 will function. Inasmuch as the radio frequency voltages impressed on the control grids 8 and 9 of tubes 10 and 11 are in opposite phase, it then follows that the current in coil 38, say, in the common anode circuit of tubes 10 and 11 will have a phase angle during one half of the audio cycle which is exactly opposite to the phase angle of the current during the other half of the audio frequency cycle. Considering the tubes 10 and 11 as current squared impedances of very high impedance compared to coil 38, the current in coil 38 will then be expressed by:

$$I_b = K(K_1\Phi \cos \omega_1 t \sin \theta + K_3 \sin \omega_2 t)^2$$

or:

Since under all conditions, $K_1$ is small compared with $K_3$, it is permissible to neglect the first term of the expression, so that $$I_b = K\left\{\frac{K_3^2}{2}(1-\cos 2\omega_2 t) + K_1\Phi \sin \theta[\sin(\omega_1+\omega_2)t - \sin(\omega_1-\omega_2)t]\right\}$$

The voltage induced in coil 36 as a result of this current will be $$E = K\frac{dI_b}{dt}$$

Assuming that the coil 38 will have negligible reactance at the low frequency $$\frac{2\omega_2}{2\pi}$$

it will be permissible to neglect the term containing $\cos 2\omega_2 t$ so that:

$$E_n = K_2\Phi \sin \theta\{\cos[(\omega_1+\omega_2)t+\alpha] - \cos[(\omega_1-\omega_2)t+\alpha]\}$$

where $\alpha$ is a phase angle depending on the impedance characteristics of the coils 36 and 38. This will be recognized as a wave consisting of two sidebands of frequency $\omega_1 \pm \omega_2$ respectively, without a carrier, which may also be written:

$$E_n = K_2\Phi \sin \theta \sin(\omega_1 t+\alpha) \sin \omega_2 t$$

There is also added to this voltage the voltage induced by the antenna 32, graphically represented in Fig. 3 from the equation:

$$E_a = K_2\phi \sin \omega_1 t$$

The resultant voltage in coil 36 will then be $$E_r = \Phi\{K_3 \sin \omega_1 t + K_4[\sin \theta \sin(\omega_1 t+\alpha)\sin \omega_2 t]\}$$

which is the expression for a carrier of $K_2\Phi \sin \omega_1 t$ modulated by $K_4 \sin \theta \sin \omega_2 t \cos \alpha$. By adjusting the reactances of the combination of coils 36 and 38 and sometimes by detuning the loop and associated circuits the angle $\alpha$ is kept small. The relation of $E_a$, $E_n$ and $E_r$ is shown by a vector diagram in Fig. 4, with the angle somewhat exaggerated. Fig. 5 shows the resultant of the curves shown in Figs. 2 and 3 plotted with the curve shown in Fig. 2.

In fact, the entire successful operation of the compass is dependent on the preservation of a reasonably constant value for the value of $\alpha$ which I will discuss further as this specification proceeds. Assuming, however, for the moment that $\alpha$ is small and remains within the range where the sign of $\cos \alpha$ will not change, it will be apparent that after passing through the radio receiver where it is amplified and demodulated, there will be an audio frequency current present in the earphone circuit (106) of $$E_p = K_6\Phi \sin \theta \sin \omega_2 t \cos \alpha$$

from which it will be observed that $\sin \theta$ being a term in the expression, the amplitude and polarity of this audio frequency term will be a function of the position of loop 1 with respect to the incident wave.

This alternating potential is amplified by tube 78 and impressed on moving coil 70 of indicator 67. If then, the loop deviates to the right of a line between the axis of the loop and the received transmitter, the direction of the winding 70 is such that the indicating needle 71 of indicator 67 will move to the right and, similarly, if there occurs a variation to the left, the alternating potential in the output of receiver 35 will be of opposite phase and indicating needle 71 of indicator 67 will move to the left.

In order to provide bias control for the control grids 8, 9, of tubes 10 and 11, I connect a rectifier 92 in a position to rectify a portion of the output of amplifier tube 78, and usefully employ the rectified output to control the potential on the control grids 8 and 9 of tubes 10 and 11. By means of the resistors 93 and 94 connected respectively from a cathode of rectifier 92 to the source 40 of high potential and to the ground at 95, cathode 96 of rectifier 92 is maintained at potential positive with respect to anode 97 of rectifier 92. So long as the instantaneous value of the alternating potential communicated to plate 97 of rectifier 92 through condenser 98 remains less than the positive potential of cathode 96 with respect to plate 97, no current flows through rectifier 92. Immediately, however, that the value of the alternating current impressed on plate 97 exceeds the positive bias of cathode 96, current flows through rectifier 92 back to ground through resistance 99 which charges condenser 100 through resistor 101 at a negative potential with respect to ground. This potential is impressed through resistors 102 and 103 on control grids 8 and 9, thus reducing the transconductance of tubes 10 and 11, and thereby serving to prevent further increase of the current in coil 38. It will thus be seen that the bias control becomes effective when the amplitude of the signal energy from loop 1 increases beyond a value predetermined by the value of the positive bias on cathode 96.

Thus, the amplitude of the audio frequency output of the tube 78 impressed on moving coil 70 of the indicator 67 is limited to a fixed predetermined value necessary to give full deflection of the indicator, regardless of the voltage picked up by loop 1 in excess of that necessary to produce such deflection. This limiting effect on the output of the modulator system also has other effects which are of great importance in preserving the accuracy of the radio compass in service. It was assumed above that the tubes 10 and 11 were identical in their electrical characteristics and that the output of the balanced modulator system of which they are a part would, therefore, consist of two sidebands without a carrier.

However, it often happens that two similar tubes become, after use, dissimilar in their electrical characteristics or it is even possible that one of them might become inoperative. In such an event, there would be impressed on coil 36 an additional voltage of frequency $\omega_1$, and of the value:

$$E_u = K_7 \Phi \sin \theta \sin (\omega_1 t + \alpha)$$

When this occurs, if $E_u$ is larger than $E_a$ and of opposite sign, it is obvious that $E_u$ will neutralize $E_a$ and the polarity of the audio frequency impressed on indicator 67 will be the opposite of what it would be if $E_u$ were not present, thus causing an erroneous indication.

By limiting the output of the balanced modulator, as explained above, to that necessary to give full scale deflection of the indicator, the possibility that $E_u$ may exceed $E_a$ is eliminated for all reasonable values of $E_a$ so that the radio compass will function properly even though one of the tubes 10 or 11 is completely out of action. My limiting system also serves to eliminate excessive interference with the normal aural reception through the earphones resulting from the audio frequency tone from the modulator.

It is apparent from the foregoing that the consistent performance of the radio compass depends on the maintenance of the angle $\alpha$, the phase angle between the non-directional antenna component and the modulator output component, at a fairly small uniform value. It is apparent, since the term $\cos \alpha$ appears in the expression for the audio output of the receiver, that a variation of $\alpha$ sufficient to cause a change in sign of $\cos \alpha$ will result in erroneous indications, or if $\cos \alpha = 0$, in no indications at all. One of the features of my radio compass is a circuit whereby a tuned antenna input system may be used without risk of a change in this angle in the event of mistuning. The advantages of a tuned antenna system in the improvement of signal-to-noise ratio at very low field strength, especially with small antennae, such as used on aircraft, and in improvement of selectivity, are well known to those skilled in the art.

It is apparent that the phase of the voltage output of the modulator is affected by the exactness with which the loop is tuned to resonance, and that, similarly, the phase angle of the antenna voltage is influenced by the tuning of the antenna coil. However, it is possible to fix the characteristics of the loop and its associated circuits at the time of manufacture of the device, and due to the well known fact that the electrical characteristics of a properly shielded loop are little affected by external conditions, this circuit will not be appreciably affected by varying conditions of installation. On the other hand, the antenna is considerably affected by external conditions and will vary through a wide range for different installations and it is necessary to adjust the antenna tuning capacity by means of condenser 109 after the installation is made. If this adjustment causes a phase shift in the antenna voltage without causing a similar shift in the modulator voltage, then the device is susceptible to the maladjustment of possibly unskilled persons.

In my device, I provide a means of coupling the modulator output to the tuned antenna circuit in such a manner that a mistuning of this circuit will shift the modulator output voltage through the same angle as the antenna voltage and will also attenuate both voltages in the same degree, thus preserving the important phase angle and relative amplitude of both components regardless of possible mistuning of the antenna tuning adjustment. Of course, mistuning will cause a loss of maximum sensitivity, but will not cause any erroneous indications.

Fig. 6 shows the equivalent circuit of the system consisting of coils 36 and 38 where $E_1$ is the modulator voltage, $r_p$ is the equivalent plate resistance of the modulator tubes, $C_p$ is that capacity represented by coil 38 shunted by the capacities of the modulator plates, wiring and coil capacity, coil 38 being of such a value as to be resonant under these conditions at a frequency lower than the lowest to which the receiver will tune. $C_c$ is the coupling capacity 108, $r_c$ the resistance of coil 38, $E_2$ is the antenna voltage, $C_a$ and $r_a$ are the capacity and resistance of the antenna system, while $Z_1$ is the equivalent impedance of coil 36 and its associated tuning condensers. In the event that coils 38 and 36 are inductively coupled, the condenser 108 is of such a value that the leakage inductance will be resonant at a frequency lower than any to which the system will tune.

It is also possible that the resonant frequencies determined by coil 38 with its inherent shunt capacity and by the leakage inductance with condenser 108 be higher than the tuning range of the system in which case $C_c$ and $C_p$ would be replaced by equivalent inductances.

It will be apparent that the currents flowing in impedance $Z_1$, which we will call $I_1$ and $I_2$, respectively, those resulting from the voltages $E_1$ and $E_2$, will induce voltages across $Z_1$, which will have to each other exactly the same phase angle as the angle between the two currents, regardless of the character or value of $Z_1$. When $Z_1$ is not resonant, its impedance is small compared with $C_a$ and $C_c$ so that the currents $I_1$ and $I_2$ will maintain substantially constant phase angles with respect to $E_1$ and $E_2$. The foregoing is only true considering $E_1$ and $E_2$ to have identical frequencies.

Due to the sidebands present in $E_1$, this is not precisely true, but $\omega_2$ is always so small compared with $\omega_1$ that the difference in frequency is negligible.

The value of $C_c$ in Fig. 6 is of high impedance compared with the impedance of the system comprising $E_2$, $r_a$, $C_a$ and $Z_1$, so that when it is desired to use the associated receiver 35 as an ordinary radio receiver, it is necessary only to interrupt the plate potential supply to the radio compass system by means of switch 105. The coupling impedance $C_c$ being high compared with the associated circuit, the effect of the output circuit of the balanced modulator comprising tubes 10 and 11 and associated impedances in reducing the signal input to receiver 35 from antenna 32 will be small.

If the receiver 35 is provided with automatic volume control, operated from the carrier strength of the received signal such that the audio output voltage is proportional only to the percentage of modulation within a wide range of input voltages, then the radio compass will provide a uniform deflection of meter 67 for a given angle of loop 1 (angle θ) within that range of input voltages, which means that if the compass is installed on a craft approaching a radio station, it is not necessary for the operator to compensate for the increasing signal strength of the station as the craft approaches. This function is different and distinct from the automatic limiting of modulator output in accordance with audio output as described above.

Switch 105 serves to cut on or off the radio compass system, leaving the receiver operation for use as a normal receiver without changing any of the circuits of either the receiver or compass parts of the system. A master control switch, not illustrated, is adapted to serve as a master control for turning off and on all power circuits to the electron tubes in the apparatus. Telephone headset 106 permits aural reception of signaling energy simultaneously with visual observation of the received signaling energy by the position of indicator 71 on calibrated dial 72.

Fig. 7 illustrates the arrangement of my radio compass schematically in which the several units illustrated in detail in Fig. 1 are shown in block form for the sake of brevity. That is to say, the essential parts of the system are illustrated in block form wherein reference character 110 designates the modulator tubes 10 and 11 and their associated circuits connected with the transmission line which leads to the loop 1. Reference character 111 designates the coupling system which includes coil 38, condenser 108, and coil 36, illustrated in detail in Fig. 1. The receiver is indicated by reference character 35, as in Fig. 1, connected with antenna 32 and with the audible signal reproducer 106. The block 112 includes the filter constituted by condenser 79 and resistor 80, and inductance 81 and condenser 82. The associated amplifier 78 is shown as included in block 114. The rectifier 92 is shown as included in block 115 connected as schematically indicated with the modulator 110. The oscillator has been shown as illustrated in Fig. 1, as including the multi-electrode electron tube 59 and associated circuits containing inductance 54. The source of potential is indicated generally at 40.

The control switch 105 has been shown for cutting on and off the radio compass independently of the operation of the non-directional radio receiver 35. The manner in which the system functions to operate two or more indicators is illustrated by the arrangement of the indicators 67, 116 and 117. The moving coils of each of the respective indicators shown at 70, 118, and 119 may be connected in parallel to the output of amplifier 114. The actuating windings 73—74, 120—121, and 122—123 of the respective indicators are shunted by the tuning condensers 75, 124 and 125, respectively, and connected with the oscillator 59 as shown. The condensers are a permanent part of the indicator structures so that when the indicator structures are added or removed, the condensers are added or removed therewith. My circuit is adaptable to the use of two or more indicators, because:

a. The power factor of the circuit comprising the various actuating coils of the indicators is unchanged by the addition or removal of any combination of coils and associated condensers.

b. Due to the electronic coupling of the actuating coil circuit to the oscillator circuit, the magnitude and character of the impedance represented by the indicator actuating coil circuit has a negligible effect on the amplitude and frequency of the output of the oscillator.

c. Thus, as an additional indicator is connected, it is found that the relative phase of the separate current in the actuating coils of the separate indicators bears a like relationship to the phase of the voltage of the oscillator.

I have indicated the connection 107 which is the plate circuit connection to the electron tube circuits of receiver 35 from the potential source indicated at 40. The potential source 40 is illustrated as a battery but it will be understood that a dynamotor or generator or other form of power source may be employed.

I have found the radio compass system of my invention particularly efficient by virtue of the phase control of the visual indicator, the manner of correlating the signaling energy received by the loop system with the signaling energy received by the antenna, the manner of increasing the effectiveness of the signaling energy received by the loop system upon the balanced electron tube system, the manner of electronically coupling the source of oscillations with the balanced electron tube system, the automatic modulation control, the method of electronic modulation, the electronic coupling of the indicating meter field coil, and the manner of preventing variations in the plate circuits of the balanced tube system from impressing any similar degree of variation from the source of potential upon the circuits of the radio compass receiver. These and other features of the circuit arrangement of my invention reside in the efficient operation of the radio compass system of my invention.

While I have described my invention in one of its preferred embodiments, I desire that it be understood that modifications may be made and that no limitations upon my invention are intended other than may be imposed by the scope of the appended claims.

What I claim as new and desire to secure by Letters Patent of the United States is as follows:

1. In a radio compass system, a directional receiving means, a non-directional receiving means, an oscillator, a modulator responsive to the combined outputs of said directional receiving means and said oscillator, a tuned impedance coupled to said non-directional receiving means, means for coupling said impedance to the output of said modulator including means for maintaining the phase angle between the voltage induced in said impedance by said modulator and the voltage induced in said impedance by said non-directional receiving means substantially independent of the phase angle between the resultant current in said impedance and the resultant voltage across said impedance, a signal receiving system connected to said impedance, an indicator responsive to the combined outputs of said receiving system and said oscillator for indicating the relative phase angle of the output of said receiving system and the output of said oscillator.

2. In a radio compass system, a directional receiving means, a non-directional receiving means, an oscillator, a modulator wherein are combined the output of said oscillator and one of said receiving means, an impedance, wherein are combined the output of said modulator and the other of said receiving means, a receiving system for amplifying and demodulating the resultant voltage across said impedance, an amplifying system responsive principally to the frequency of said oscillator and connected to the output of said receiving system, an indicator having two coacting coils, one of which is connected to said oscillator, the other of which is connected to the output of said amplifying system, and means for reducing the output of said modulator in proportion to the output of said amplifying system.

3. In a radio compass system, a directional receiving means, a non-directional receiving means, an electronic modulator connected to said directional receiving means, an oscillator connected to said modulator, a receiving system responsive to the combined outputs of said modulator and said non-directional receiving means, an amplifier connected to the output of said receiving system, a rectifier connected to the output of said amplifier, means whereby the output of said rectifier is impressed on said modulator, means whereby the cathode of said rectifier is caused to assume a positive potential with respect to the mean potential of the anode of said rectifier for reducing the output of said modulator in proportion to the amount by which the alternating potential on the anode of said rectifier exceeds the positive potential on the cathode of said rectifier, an indicator responsive to the combined outputs of said amplifier and said oscillator for indicating the relative phase of the outputs of said directional receiving means and said non-directional receiving means.

4. In a radio compass system comprising, in combination with a directional receiving means, a non-directional receiving means, an oscillator, a modulator wherein are combined the outputs of said directional receiving means and said oscillator, a receiving system, means whereby the combined outputs of said modulator and said non-directional receiving means are impressed on said receiving system, an amplifier connected to the output of said receiving means, an indicator responsive to the combined outputs of said receiving means and said oscillator, and means connected in the output of said amplifier and effective on said modulator for reducing the output of said modulator in proportion to the amount by which the output of said amplifier exceeds a fixed predetermined value.

5. In a radio compass system, a directional signal receiving system, a balanced electron tube system connected with said directional signal receiving system, a non-directional signal receiving system, a signal receiving circuit connected with said non-directional signal receiving system, means for coupling the output circuit of said balanced electron tube system with said signal receiving circuit and maintaining the phase angle between the output voltages of said balanced electron tube system and said non-directional signal receiving system in said signal receiving circuit substantially constant, a local oscillator, means for rendering said local oscillator effective upon said balanced electron tube system, a visual indicator, and connections from said signal receiving circuit and from said local oscillator with said visual indicator for controlling said visual indicator according to the conjoint effect of the signaling energy received by said directional receiving system and said non-directional receiving system.

6. In a radio compass system, a directional signal receiving system, a balanced electron tube system connected with said directional signal receiving system, a non-directional signal receiving system, a signal receiving circuit connected with said non-directional signal receiving system, means for coupling the output circuit of said balanced electron tube system with said signal receiving circuit and maintaining the phase angle between the output voltages of said balanced electron tube system and said non-directional signal receiving system in said signal receiving circuit substantially constant, a local oscillator, said balanced electron tube system including a pair of electron tubes, each containing, in addition to the operating electrodes, a modulating grid and connections between said local oscillator and said modulating grids for rendering the electron tubes of said balanced electron tube system alternately effective, a visual indicator, and a pair of coacting windings in said visual indicator, one of said windings being excited from said oscillator, and the other of said windings being energized from the output of said signal receiving circuit.

7. In a radio compass system, a directional signal receiving system, a balanced electron tube system connected with said directional signal receiving system, a non-directional signal receiving system, a signal receiving circuit connected with said non-directional signal receiving system, means for coupling the output circuit of said balanced electron tube system with said signal receiving circuit and maintaining the phase angle between the output voltage of said balanced electron tube system and said non-directional signal receiving system in said signal receiving circuit substantially constant, a local oscillator, said balanced electron tube system including a pair of electron tubes, each containing in addition to the operating electrodes, a modulating grid; and connections between said local oscillator and said modulating grids for rendering the electron tubes of said balanced electron tube system alternately effective, a visual indicator, and a pair of coacting windings in said visual indicator, said windings being acted upon in differential phase relation by currents impressed thereon independently from the output of said signal receiving circuit and from the output of said local oscillator.

8. In a radio compass system, a directional signal receiving system, a balanced electron tube system connected with said directional signal receiving system, a non-directional signal receiving system, a signal receiving circuit connected with said non-directional signal receiving system, means for coupling the output of said balanced electron tube system with said signal receiving circuit, a local oscillator, means for rendering said local oscillator effective upon said balanced electron tube system, a visual indicator containing a pair of windings, connections between one of said windings and the output of said oscillator, connections between the output of said signal receiving circuit and the other of said windings for differentially controlling the operation of said visual indicator according to the phase of the currents in said windings, and means operated by energy delivered by the output of said signal receiving circuit for controlling the operation of said balanced electron tube system above a predetermined range of operation.

9. In a radio compass system, a directional signal receiving system, a balanced electron tube system connected with said directional signal receiving system, a non-directional signal receiving system, a signal receiving circuit connected with said non-directional signal receiving system, means coupling the output of said balanced electron tube system with said signal receiving circuit, a local oscillator, means rendering said local oscillator effective upon said balanced electron tube system, a visual indicator, an aural indicator connected with said signal receiving circuit, connections between said signal receiving circuit and said local oscillator with said visual indicator for controlling said visual indicator according to the conjoint effect of the signaling energy received by said directional receiving system and said non-directional receiving system, and means controlled from the output of said signal receiving circuit for controlling the character of operation of said balanced electron tube system for decreasing interference in said aural indicators by the output of said oscillator, connected through said balanced electron tube system.

10. In a radio compass system, a directional receiving means, a non-directional receiving means, an oscillator, a modulator wherein are combined the output of said oscillator and one of said receiving means, an impedance, wherein are combined the output of said modulator and the other of said receiving means, a receiving system for amplifying and demodulating the resultant voltage across said impedance, an amplifying system connected to the output of said receiving system, an indicator having two coacting coils, one of which is connected to said oscillator, the other of which is connected to the output of said amplifying system, and means for reducing the output of said modulator in proportion to the output of said amplifying system.

11. In a direction finder including a directive and a non-directive antenna, the method of orienting an indicator to indicate the angular relation of a wave front and said directive antenna which comprises deriving a carrier frequency current from said non-directive antenna, deriving a second carrier frequency current which varies in amplitude and reverses in phase as a function of said angular relationship, applying modulation currents to said second carrier current, deriving side band frequency currents from said modulated carrier, eliminating currents of said second carrier frequency, combining said first carrier and said side band frequency currents, demodulating said combined currents, deriving a controlling voltage from said demodulated currents, and applying said controlling voltage to one of said carrier currents to maintain substantially constant percentage of said side band currents with respect to said first carrier currents except in the region where said phase reverses.

12. In a radio direction finder, the combination of a directive antenna, a non-directive antenna, a balanced modulator effectively connected to the directive antenna, a radio receiving device, means coupling said non-directive antenna to said device, means coupling the output of said modulator to said device so that modulation frequency currents are applied to said device, means for obtaining a demodulated audio output current from said device, said output current having a frequency corresponding to said modulation frequency, and means including a rectifier responsive to said audio output current and connected to said device to maintain the demodulated output current substantially constant in amplitude for a given signal received for all directions excepting the region immediately adjacent the null positions of said directive antenna.

FREDERICK J. HOOVEN.